United States Patent [19]
Battershell

[11] 3,869,494
[45] Mar. 4, 1975

[54] PRODUCTION OF TETRACHLOROPHTHALONITRILES

[75] Inventor: Robert D. Battershell, Plainsville, Ohio

[73] Assignee: Diamond Shamrock Corporation, Cleveland, Ohio

[22] Filed: Aug. 7, 1972

[21] Appl. No.: 278,347

[52] U.S. Cl. .......................... 260/465 G, 260/465 R
[51] Int. Cl. .......................................... C07c 121/56
[58] Field of Search ..................... 260/465 G, 465 R

[56] References Cited
UNITED STATES PATENTS
3,711,480   1/1973   Ruetman ......................... 260/465 X

*Primary Examiner*—Lewis Gotts
*Assistant Examiner*—Dolph H. Torrence
*Attorney, Agent, or Firm*—Timothy E. Tinkler

[57] ABSTRACT

The preparation of the various isometric tetrachlorinated phthalonitriles involves the liquid phase chlorination of the corresponding tetrachlorinated xylylenediamine to the N,N,N',N'-octachloroxylylenediamine intermediate followed by dehydrochlorination to the desired tetrachlorophthalonitrile. Typical is the production of tetrachloroisophthalonitrile from tetrachloro-m-xylylenediamine, the product being a valuable fungicide.

24 Claims, No Drawings

PRODUCTION OF TETRACHLOROPHTHALONITRILES

BACKGROUND OF THE INVENTION

The various tetrachlorophthalonitriles are known to be useful for their biological activity, e.g., their fungicidal activity, and are also useful intermediates in the production of phthalocyanine pigments.

These tetrachlorophthalonitriles have been produced in the past by ammoniating the corresponding acid chloride followed by dehydration of the resultant amide, as is described more fully in U.S. Pat. No. 3,290,353.

Alternately and more commonly the tetrachlorophthalonitriles are produced by the vapor phase chlorination of the various isomeric phthalonitriles in the presence of a catalyst, as is described more fully in U.S. Pat. No. 3,497,547.

This latter process, however, requires rather sophisticated equipment, leads to decomposition of both the starting material and the final product owing to the high temperatures involved and is not generally suitable for the production of small amounts of the materials in question.

STATEMENT OF THE INVENTION

Therefore, it is an object of the present invention to provide a process adaptable to the production of either small or large quantities of the desired tetrachlorophthalonitrile.

It is a further object of the present invention to provide a liquid phase process for the production of tetrachlorophthalonitriles at relatively low temperatures.

These and further objects of the present invention will become apparent to those skilled in the art from the specification and claims which follow.

There has now been found a process for the production of a tetrachlorophthalonitrile which comprises:
a. substantially completely reacting, in the liquid phase, a tetrachloroxylylenediamine and a chlorinating agent therefor to N,N,N',N'-octachloroxylylenediamine;
b. dehydrochlorinating the resultant N,N,N',N'-octachloroxylylenediamine; and
c. recovering tetrachlorophthalonitrile.

Such a process, described more fully hereinafter, has the advantage that it may be conducted at relatively low temperatures, thus minimizing reactant and product loss owing to decomposition. Further, being particularly suited to a batch type operation and not requiring sophisticated equipment, the reaction is adaptable to operation on both large and small scales, depending on the producer's requirement.

DESCRIPTION OF THE PREFERRED EMBODIMENTS

It will be understood that the term "tetrachlorophthalonitrile" is used generically, unless otherwise specified, to include tetrachlorophthalonitrile, tetrachloroisophthalonitrile and tetrachloroterephthalonitrile produced from the N-chlorinated intermediates of, respectively, tetrachloro-o-, m-, and p-xylylenediamine. Exemplary is the preparation of tetrachloroisophthalonitrile from the intermediate N,N,N',N'-octachloro-m-xylylenediamine obtained upon chlorination of tetrachloro-m-xylylenediamine.

The tetrachloroxylylenediamine starting materials are known to the art, their preparation being described, for example, in British Patent No. 970,024.

Stated simply, the process involves the liquid phase chlorination of tetrachloroxylylenediamine followed by dehydrochlorination of the resultant N,N,N',N'-octachloroxylylenediamine and recovery of the desired product. Preferably, the chlorination is conducted in a medium which, on heating subsequent to completion of the chlorination reaction, acts as a catalyst for the dehydrochlorination of the intermediate, thus eliminating the necessity for separation of an intermediate product.

As stated, the chlorination in question proceeds in the liquid phase. Agents useful for effecting this chlorination include the oxidative chlorination agents such as chlorine, hypochlorous acid, and sources of hypochlorite ($OCl^-$) ions, e.g., alkali and alkaline earth metal hypochlorites such as sodium hypochlorite and calcium hypochlorite, as well as lower alkyl hypochlorites such as t-butyl hypochlorite. Obviously, solutions must be provided to make available the hypochlorite ions. Water is suitable as a solvent for the alkali and alkaline earth metal hypochlorites, while a corresponding alcohol, e.g., t-butyl alcohol in the case of t-butyl hypochlorite, will suffice for the organic materials.

It should be understood that, depending upon the chlorination agent chosen, one may either (1) dissolve the tetrachloroxylylenediamine in a solvent therefor (e.g., in dimethylformamide with chlorine gas); (2) add solid tetrachloroxylylenediamine to the chlorinating agent in solution (e.g., t-butyl hypochlorite in t-butyl alcohol); or (3) provide both in solution (e.g., tetrachloroxylylenediamine in dimethylformamide chlorinated with t-butyl hypochlorite in t-butyl alcohol). The considerations involved in the choice of the reaction medium will appear from the description hereinbelow.

Thus, the chlorination reaction may proceed by adding tetrachloroxylylenediamine to a hypochlorite solution at room temperature, e.g., 20°–25° C. The reaction being exothermic in nature, the mixture will rise to a temperature sufficient to complete the reaction, i.e., up to 75° C, without the need for external application of heat. The reaction is terminated when the tetrachloroxylylenediamine has been substantially completely converted to the N,N,N',N'-octachloroxylylenediamine, which end point may be determined by a temperature drop or, more accurately, by periodic thin layer chromatographic (TLC) analysis. Variations in the reaction include predissolution of tetrachloroxylylenediamine in a solvent which also serves as a dehydrochlorination catalyst at elevated temperatures (e.g., dimethylformamide) and dissolving the starting material in aqueous hydrochloric acid followed by chlorination with aqueous sodium hypochlorite.

When chlorine gas is employed as the chlorination agent, the preferred practice is to dissolve the tetrachloroxylylenediamine in a solvent therefor, e.g., a dialkyl amide such as dimethylformamide. Since the reaction is somewhat exothermic and to avoid premature decomposition of the N,N,N',N'-octachloroxylylenediamine, it is desirable that the solution be cooled prior to reaction at a temperature within the range of 0°–30°, preferably 0°–5°, C.

The result of the foregoing chlorination step is the intermediate N,N,N',N'-octachloroxylylenediamine which may, if desired and depending upon the liquid medium employed in the chlorination reaction, be recovered by filtration and air drying to obtain a relatively unstable crystalline material.

If the foregoing separation is practiced, it will then be necessary to dissolve the N,N,N',N'-octachloroxylylenediamine in a solvent prior to dehydrochlorination. The preferred solvents are those that are liquid at substantially room temperature and serve to catalyze the dehydrochlorination of the N,N,N',N'-octachloroxylylenediamine, for example, dialkyl amides such as dimethylformamide, N-methylpyrrolidine, and dimethylacetamide; and t-amines such as pyridine, alpha-, beta- or gamma-picoline, and the isomeric lutidines.

If the N,N,N',N'-octachloroxylylenediamine has been separated from the chlorination medium, it will first be necessary to dissolve same, preferably in one of the just-described solvents, followed by slowly raising the temperature of the solution, usually to about 130° C. On the other hand, if, as is preferred, the medium for the chlorination reaction is or contains a solvent capable of acting as a dehydrochlorinating agent at elevated temperatures, no further addition is required and dehydrochlorination proceeds merely by slowly raising the temperature of the solution, preferably to about 130° C. In all cases the result of the dehydrochlorination reaction is a solution of the desired tetrachlorophthalonitrile.

Recovery of the product may proceed in a variety of ways, for example, simply by cooling the solution of tetrachlorophthalonitrile to about 0° C and recovering the precipitate or by cooling to about 30° C followed by the addition of several volumes of water, filtration of the resultant precipitate, thorough water washing and drying, as by air.

In order that those skilled in the art may more readily understand the present invention and certain preferred embodiments by which it may be carried into effect, the following specific examples are afforded. In these examples, all quantities recited are on a weight basis, unless otherwise stated.

EXAMPLE 1

To a solution of 14.1 g t-butyl hypochlorite in 50 ml t-butyl alcohol is added, slowly, 8.2 g of 2,4,5,6-tetrachloro-m-xylylenediamine. An exothermic reaction occurs increasing the temperature to 68° C. About 30 minutes after addition is complete, the reaction mixture begins to cool and a crystalline precipitate forms. A light yellow solid is recovered by filtration and air dried to a weight of 8.2 g. The product, N,N,N',N'-2,4,5,6-octachloro-m-xylylenediamine, melts at 67°–68° C and has the following analysis:

Calc'd for $C_8H_4Cl_8N_2$: Cl, 69.0, N, 6.8. Found: Cl, 70.3; N, 6.9.

EXAMPLE 2

A solution of 2,4,5,6-tetrachloro-m-xylylenediamine dihydrochloride is prepared by dissolving 2.74 g of the tetrachlorodiamine in 35 ml of aqueous hydrochloric acid (0.06 moles). This solution is added rapidly at 25° C, with stirring, to 85 g of aqueous 5.4 percent sodium hypochlorite. The resulting mixture is stirred for an hour during which time a tacky precipitate separates and deposits as a large lump in the reaction vessel. A sample of the precipitate has the same chromatographic characteristics as the product of Example 1.

EXAMPLE 3

Following the procedure of Example 1, 11 g of 2,3,5,6-tetrachloro-p-xylylenediamine is converted to N,N,N',N'-2,3,5,6-octachloro-p-xylylenediamine by reaction with a solution of 19.1 g t-butyl hypochlorite in 50 ml t-butyl alcohol. The product, N,N,N',N'-2,3,5,6-octachloro-p-xylylenediamine, weighs 10.3 g (63 percent of theoretical), melts at 155°–157° C and has the following analysis:

Calc'd for $C_8H_4Cl_8N_2$: Cl, 69.0; N, 6.8. Found: Cl, 69.1; N, 7.1.

EXAMPLE 4

A solution of 2.74 g of 2,4,5,6-tetrachloro-m-xylylenediamine in 10 ml of dimethylformamide is reacted with gaseous chlorine at 0°–5° C until thin layer chromatographic (TLC) analysis indicates that all of the starting material is converted to the corresponding N,N,N',N'-2,4,5,6-octachlorodiamine. After chlorination is complete, the reaction mixture is warmed to 25° C and diluted with 3 volumes of water. (The reaction mixture becomes warm and evolves chlorine upon dilution.) A light yellow solid is filtered from the diluted aqueous reaction mixture and air dried to a weight of 2.5 g. This solid contains 91 percent of tetrachloroisophthalonitrile by VPC (Vapor Phase Chromatographic) assay and represents an 80 percent yield.

EXAMPLE 5

To a solution of 2.74 g of 2,4,5,6-tetrachloro-m-xylylenediamine in 10 ml of dimethylformamide is added, dropwise, at 5°–30° C, 4.8 g of t-butyl hypochlorite. The white slurry changes to a yellow solution during the hypochlorite addition. This mixture is stirred for about 1 hour, diluted with 3 volumes of water, the solids recovered by filtration and dried. A total of 2.7 g of crude product assaying at 84 percent tetrachloroisophthalonitrile and representing an 85 percent yield is obtained.

EXAMPLE 6

To 5 ml of dimethylformamide, cooled to 5° C, is added 2 g of N,N,N',N'-2,4,5,6-octachloro-m-xylylenediamine prepared as in Example 1, causing the temperature to rise to 50° C. TLC analysis of the mixture indicates that it is tetrachloroisophthalonitrile containing a small amount of unconverted octachlorodiamine. The mixture is then heated slowly to 120° C, cooled to 25° C, and diluted with 3 volumes of water. The resultant precipitate is recovered by filtration and dried. A total of 1.2 g of 98 percent tetrachloroisophthalonitrile, representing an 87 percent yield, is obtained.

EXAMPLE 7

A solution of 2.0 g of N,N,N',N'-2,4,5,6-octachloro-m-xylylenediamine, prepared as in Example 2, in 10 ml of dimethylformamide is heated on a steam bath. The octachlorodiamine decomposes vigorously with evolution of gas, the reaction temperature rising to about 118° C. On heating to 130° C, the last traces of the solid "gas" and dissolve. When the reaction mixture is cooled to 25° C, a precipitate separates which may be filtered, washed and dried, to obtain 0.82 g of 99 percent tetrachloroisophthalonitrile representing a 63 percent yield.

Fresh dimethylformamide is added to adjust the volume of the filtrate obtained above to 10 ml. A second 2 g portion of octachlorodiamine is added, after cooling to 0° C, causing the temperature to rise to 60° C, at which point the evolution of gas begins. The temperature continues to rise to 100° C after which the reaction mixture is deliberately heated to 130° C, causing the last traces of solid to gas and dissolve. The reaction mixture is then cooled to 25° C and a second crop of product is filtered off, this assaying 95 percent tetrachloroisophthalonitrile and representing 78 percent yield.

The filtrate is again adjusted to 10 ml with DMF, cooled to 0° C and a third 2 g portion of octachlorodiamine is added. Repeating the procedure, a third crop of product weighing 0.80 g and assaying 92 percent tetrachloroisophthalonitrile is obtained.

Finally, the filtrate is diluted with 3 volumes of water. The precipitate recovered weighs 0.23 g and assays 64 percent tetrachloroisophthalonitrile.

EXAMPLE 8

A solution of 8.22 g of 2,3,5,6-tetrachloro-p-xylylenediamine in 50 ml dimethylformamide is reacted with gaseous chlorine at 0°–5° C. An exothermic reaction occurs and a white precipitate forms. After about 30 minutes, the color of the slurry changes from white to yellow and TLC analysis shows the presence of N,N,N',N'-2,3,5,6-octachlorodiamine containing a trace of tetrachloroterephthalonitrile. On heating the reaction mixture to 50° C, gas evolution begins and the temperature continues to rise to about 65° C. When gasing ceases, the mixture is diluted with 3 volumes of water and a precipitate forms, found on recovery to be 7.5 g of 91 percent tetrachloroterephthalonitrile.

EXAMPLE 9

To a solution of 3.5 g t-butyl hypochlorite in 15 ml t-butyl alcohol at room temperature is slowly added, with stirring, 2.0 g 3,4,5,6-tetrachloro-o-xylylenediamine. The solution temperature rises to 50° C. After 20 minutes, a small excess of t-butyl hypochlorite is added and the reaction mixture heated at 70° C for several more minutes to insure complete reaction. After cooling to 30° C, the reaction mixture is filtered and the yellow precipitate is air dried to obtain 2.4 g (80 percent yield) of N,N,N',N'-3,4,5,6-octachloro-o-xylylenediamine. The product melts at 118.5° C with decomposition and decomposes violently at temperatures above its melting point. It has the following analysis:

Calc'd for $C_8H_4Cl_8N_2$: C, 23.4; H, 1.0; N, 6.8; Cl, 68.7. Found: C, 23.3; H, 1.1; N, 6.9; Cl, 68.7.

EXAMPLE 10

To 5 ml pyridine is rapidly added, with stirring, 0.5 g of the N,N,N',N'-3,4,5,6-octachloro-o-xylylenediamine from Example 9. On dissolution an exothermic reaction occurs, raising the solution temperature to 78° C. When cooled, pyridine hydrochloride precipitates from solution and is removed by filtration. To the filtrate is added an excess of water thus precipitating a purple solid, which solid is filtered, washed with water and air dried to a weight of 0.3 g (93 percent yield) of 3,4,5,6-tetrachlorophthalonitrile having the following analysis: Calc'd for $C_8Cl_4N_2$: C, 36.2; H, 0.0; N, 10.5. Found: C, 36.0; H, 0.4; N, 10.8.

It is to be understood that although the invention has been described with specific reference to particular embodiments thereof, it is not to be so limited, since changes and alterations therein may be made which are within the full and intended scope of the appended claims.

What is claimed is:

1. A process for the production of a tetrachlorophthalonitrile which comprises:
   a. substantially completely reacting, in the liquid phase, a tetrachloroxylylenediamine and a chlorinating agent therefor to N,N,N',N'-octachloroxylylenediamine;
   b. dehycrochlorinating the resultant N,N,N',N'-octachloroxylylenediamine; and
   c. recovering tetrachlorophthalonitrile.

2. A process as in claim 1 wherein the temperature of the reaction of step (a) is within a range of about 0°–75° C.

3. A process as in claim 1 wherein the dehydrochlorination proceeds at a temperature within a range of about 30°–130° C.

4. A process as in claim 1 wherein step (c) includes precipitation of tetrachlorophthalonitrile from solution by the addition of water.

5. A process as in claim 4 wherein the solution is cooled to about 30° C prior to precipitation with water.

6. A process as in claim 1 wherein the chlorinating agent is selected from the group consisting of gaseous chlorine and solutions of hypochlorite and hypochlorous acid.

7. A process as in claim 1 wherein dehydrochlorination occurs in the presence of a solvent from the group consisting of t-amines and dialkyl amides.

8. A process as in claim 7 wherein the solvent is a t-amine and is selected from the group consisting of pyridine; alpha-, beta-, and gamma-picolines; and the isomeric lutidines.

9. A process as in claim 7 wherein the solvent is a dialkyl amide and is selected from the group consisting of dimethylformamide, N-methylpyrrolidine, and dimethylacetamide.

10. A process for the production of a tetrachlorophthalonitrile which comprises:
    a. dissolving tetrachloroxylylenediamine in a solvent therefor;
    b. adding a chlorinating agent and substantially completely reacting to N,N,N',N'-octachloroxylylenediamine;
    c. dehydrochlorinating the N,N,N',N'-octachloroxylylenediamine by heating the solution thereof; and
    d. recovering the resultant tetrachlorophthalonitrile.

11. A process as in claim 19 wherein the solvent is selected from the group consisting of t-amines and dialkyl amides.

12. A process as in claim 10 wherein the solvent is a t-amine selected from the group consisting of pyridine; alpha-, beta-, and gamma-picolines; and the isomeric lutidines.

13. A process as in claim 10 wherein the solvent is a dialkyl amide selected from the group consisting of dimethylformamide, N-methylpyrrolidine, and diemthylacetamide.

14. A process as in claim 10 wherein the temperature of step (b) is maintained within the range of about 0°–20° C.

15. A process as in claim 10 wherein dehydrochlorination occurs at a temperature within a range of 30°–130° C.

16. A process for the production of a tetrachlorophthalonitrile which comprises:
   a. substantially completely reacting tetrachloroxylylenediamine with a source of OCL⁻ in a solvent for the latter;
   b. separating from the reaction mixture the resultant N,N,N',N'-octachloroxylylenediamine;
   c. dissolving the N,N,N',N'-octachloroxylylenediamine in a solvent selected from the group consisting of t-amines and dialkyl amides;
   d. dehydrochlorinating the solution by raising the temperature thereof; and
   e. recovering the resultant tetrachlorophthalonitrile.

17. A process as in claim 16 wherein the temperature of step (a) is maintained within the range of about 20°–75° C.

18. A process for the production of a tetrachlorophthalonitrile which comprises:
   a. dissolving a tetrachloroxylylenediamine in a solvent therefor which is also a dehydrochlorinating agent for the intermediate formed in step (b);
   b. substantially completely reacting said solution with chlorine to N,N,N',N'-octachloroxylylenediamine;
   c. dehydrochlorinating said solution of N,N,N',N'-octachloroxylylenediamine by the application of heat thereto; and
   d. recovering the resultant tetrachlorophthalonitrile.

19. A process as in claim 18 wherein the temperature of step (b) is maintained within the range of about 0°–20° C.

20. A process as in claim 18 wherein the solvent is selected from the group consisting of t-amines and dialkyl amides.

21. A process for the production of a tetrachlorophthalonitrile which comprises:
   a. dissolving tetrachloroxylylenediamine in a solvent therefor which is also a dehydrochlorinating agent for the intermediate formed in step (b);
   b. adding a solution of OCl⁻ and reacting to the N,N,N',N'-octachloroxylylenediamine;
   c. dehydrochlorinating the N,N,N',N'-octachloroxylylenediamine by the application of heat to the solution thereof; and
   d. recovering the resultant tetrachlorophthalonitrile.

22. A process as in claim 21 wherein the temperature of step (b) is maintained within the range of about 0°–30° C.

23. A process as in claim 21 wherein the recovery step includes precipitation of tetrachlorophthalonitrile from solution by the addition of water.

24. A process as in claim 21 wherein the solvent in step (a) is selected from the group consisting of t-amines and dialkyl amides.

* * * * *